US012212432B2

(12) United States Patent
Zhou et al.

(10) Patent No.: US 12,212,432 B2
(45) Date of Patent: Jan. 28, 2025

(54) METHOD AND SYSTEM OF REAL-TIME DATA MONITORING FOR VEHICLE

(71) Applicant: Harman Becker Automotive Systems GmbH, Karlsbad (DE)

(72) Inventors: Tingting Zhou, Jiangsu (CN); Yuliu Cao, Jiangsu (CN); Franz Lorenz, Kelheim (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 41 days.

(21) Appl. No.: 17/801,000

(22) PCT Filed: Feb. 21, 2020

(86) PCT No.: PCT/CN2020/076169
§ 371 (c)(1),
(2) Date: Aug. 19, 2022

(87) PCT Pub. No.: WO2021/163994
PCT Pub. Date: Aug. 26, 2021

(65) Prior Publication Data
US 2023/0089105 A1 Mar. 23, 2023

(51) Int. Cl.
*H04L 12/40* (2006.01)
(52) U.S. Cl.
CPC .. *H04L 12/40117* (2013.01); *H04L 12/40078* (2013.01); *H04L 2012/40273* (2013.01)
(58) Field of Classification Search
CPC ................................................ G06F 13/4282
See application file for complete search history.

(56) References Cited

U.S. PATENT DOCUMENTS

| 2015/0365754 | A1* | 12/2015 | Perl .......................... H04R 1/08 381/86 |
| 2016/0034146 | A1* | 2/2016 | Daly, Jr. ............. G06F 3/04842 715/735 |
| 2017/0220502 | A1 | 8/2017 | Kessler et al. |
| 2017/0323631 | A1* | 11/2017 | Close .................. G06F 13/4291 |

FOREIGN PATENT DOCUMENTS

| CN | 103946829 A | 7/2014 |
| CN | 107346657 A | 11/2017 |
| CN | 108924383 A | 11/2018 |
| CN | 210007874 U | 1/2020 |

OTHER PUBLICATIONS

International Search Report dated Nov. 25, 2020 for PCT Appn. No. PCT/CN2020/076169 filed Feb. 21, 2020, 9 pgs.
Extended European Search Report dated Sep. 22, 2023 for European Patent Application No. 20920096.3, filed Aug. 1, 2022, 7 pages.
Philips Semiconductors, "The I2C-bus Specification", Philips Semiconductors Product Specification, Jan. 31, 2001, 46 pages.
Kessler, M., "Introducing the Automotive Audio Bus (A2B)", AES Conference on Automotive Audio, Sep. 1, 2017, 5 pages.

* cited by examiner

*Primary Examiner* — Henry Tsai
*Assistant Examiner* — Juanito C Borromeo
(74) *Attorney, Agent, or Firm* — Brooks Kushman P.C.

(57) ABSTRACT

The aspects disclosed herein generally provide a method and a system of real-time data monitoring for a vehicle. The method comprises packaging monitoring data into one or more physical Automotive Audio Bus (A2B) channels according to a data package protocol; transferring the packaged monitoring data via a A2B bus; and unpackaging the transferred data and displaying the unpackaged monitoring data.

19 Claims, 7 Drawing Sheets

| FrameNr (Physical Channel 1) | 0 | 1 | 2,3,4,...,15,16,17 | 18 | 19,20,21,...,24,25,26 | 27,28,29,30,31 | 0 |
|---|---|---|---|---|---|---|---|

| | SYNC | MAGIC | DATA(ACC) | MAGIC | DATA(MIC) | ZERO | SYNC |
|---|---|---|---|---|---|---|---|
| Sample Content | 0x68<br>0x68<br>0x68<br>0x68 | 0xBB<br>0x00<br>0x20<br>0x10 | 16 accelerometer data each 32 bits | 0xBB<br>0x01<br>0x20<br>0x08 | 8 microphone data each 32 bits | | 0x68<br>0x68<br>0x68<br>0x68 |

Frequency(repeat) = fs / 32 = 48 kHz / 32 = 1.5 kHz

| FrameNr (Physical Channel 2) | 0 | 1 | 2,3,4,5,6,7,8 | 10,11,12,...,29,30,31 | 0 |
|---|---|---|---|---|---|

| | SYNC | MAGIC | DATA(SPK) | ZERO | SYNC |
|---|---|---|---|---|---|
| Sample Content | 0x68<br>0x68<br>0x68<br>0x68 | 0xBB<br>0x02<br>0x20<br>0x08 | 8 speaker data each 32 bits | | 0x68<br>0x68<br>0x68<br>0x68 |

Frequency(repeat) = fs / 32 = 48 kHz / 32 = 1.5 kHz

FIG.5

| FrameNr (Physical Channel 1) | 0 | 1 | 2,3,4,5,6,7 | 0 | 1 | 2,3,4,5,6,7 | 0 |
|---|---|---|---|---|---|---|---|

| | SYNC | MAGIC | DATA(iESS) | SYNC | MAGIC | DATA(iESS) | MAGIC |
|---|---|---|---|---|---|---|---|
| Sample Content | 0x68<br>0x68<br>0x68<br>0x68 | 0xBB<br>0x03<br>0x08<br>0x06 | 6 iESS signals each 32 bits | 0x68<br>0x68<br>0x68<br>0x68 | 0xBB<br>0x03<br>0x08<br>0x06 | 6 iESS signals each 32 bits | 0x68<br>0x68<br>0x68<br>0x68 |

Frequency(repeat) = fs / 8 = 48 kHz / 8 = 6 kHz

FIG.6

METHOD AND SYSTEM OF REAL-TIME DATA MONITORING FOR VEHICLE

CROSS-REFERENCE TO RELATED APPLICATION

This application is the U.S. national phase of PCT Application No. PCT/CN2020/076169 filed on Feb. 21, 2020, the disclosure of which is incorporated in its entirety by reference herein.

BACKGROUND

The present disclosure is related to real-time data monitoring for vehicles, and more specifically, to a method and a system of real-time data monitoring in an amplifier of the vehicle based on Automotive Audio Bus (A2B) bus.

More and more audio algorithms are created and performed in a Vehicle Amplifier, the real-time data monitoring becomes more and more desirable. And the real-time data monitoring needs to support different data type, different data sampling rates, and different data channels number. Currently there is no available tool to support the real-time data monitoring including the above three features at the same time.

SUMMARY

According to one aspect of the disclosure, a method may include packaging monitoring data into one or more physical A2B channels according to a data package protocol. The method also includes transferring the packaged monitoring data via a A2B bus, and unpackaging the transferred data and displaying the unpackaged monitoring data.

Preferably, the data package protocol may be configured to form a data frame including one synchronization data unit, at least one information data unit and at least one monitoring data unit for one physical A2B channel.

Preferably, the synchronization data unit may be filled with a value for synchronizing the monitoring data in one physical A2B data channel. The information data unit may include four sub-units which are respectively filled with four values, each value representing one information of an identification, a signal type, a sampling rate and a number of data channels for the monitoring data. Moreover, the monitoring data unit may be filled with the monitoring data associated with the information data unit.

Preferably, the method may further comprise: calculating a first number value of total data channels for the monitoring data; calculating a second number value of consumed data channels for the monitoring data in the case of using one physical A2B channel; comparing the first number value and the second number value; and based on the comparison, packaging the monitoring data into one or more physical A2B channels.

Preferably, the method may further comprise packaging the monitoring data into one physical A2B channel if the first number value is equal to or larger than the second number value.

Preferably, the method may further comprise packaging the monitoring data into more than one physical A2B channel if the first number value is less than the second number value.

Preferably, the method may further comprise calculating a first number value of total data channels based on a monitoring data sampling rate and an A2B channel sampling rate.

Preferably, the method may further comprise calculating a second number value of consumed data channels based on the number of information data unit for one physical A2B channel, the number of the signal types, the total number of signals for monitoring data.

Preferably, the method may further comprise extracting information from the at least one information data unit of the packaged data to obtain the information of signal type, the sampling rate and the number of data channels for monitoring data.

According to another aspect of the present disclosure, a system may include an amplifier, a Universal Serial Bus (USB)-A2B Box and a monitoring device. The amplifier may package monitoring data into one or more physical A2B channels according to a data package protocol, and transfer the packaged monitoring data via a A2B bus. The USB-to-A2B Box may receive the packaged monitoring data via a A2B bus and transfer the packaged monitoring data, for example, may transfer data via a USB bus. The monitoring device may receive the packaged monitoring data, for example, via a USB bus from the USB-to-A2B Box, unpackage the transferred data according to the data package protocol and display the unpackaged monitoring data.

According to another aspect of the present disclosure, a computer readable media having computer-executable instructions for performing the abovesaid method is provided.

BRIEF DESCRIPTION OF THE DRAWINGS

FIG. 5 illustrates another schematic view for data package according to one or more embodiments.

FIG. 6 illustrates another schematic view for data package according to one or more embodiments.

Figure 1:
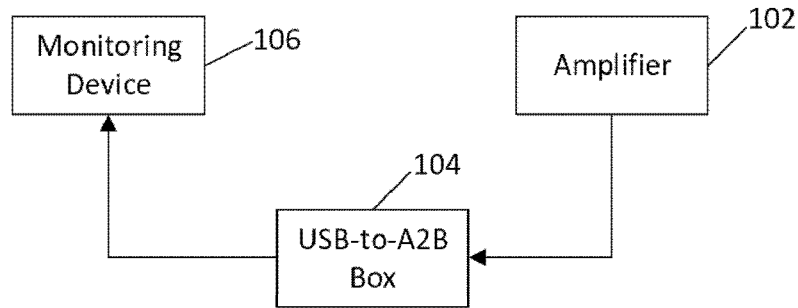
FIG. 1 illustrates an overview block diagram of system for real-time data monitoring according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION OF THE PREFERRED EMBODIMENTS

Embodiments herein describe a system and a method of real-time data monitoring for vehicle amplifier system based on A2B bus. Usually, there are more and more algorithms which are performed in the vehicle amplifier system, such as the Road Noise Cancellation (RNC) algorithm, the Internal Engine Sound Synthesis (iESS) algorithm, and so on. With the system and the method described herewith, the tuning engineer can easily monitor all the data in the vehicle amplifier for different data type, different data sampling rate and different numbers of data channels.

Figure 2:
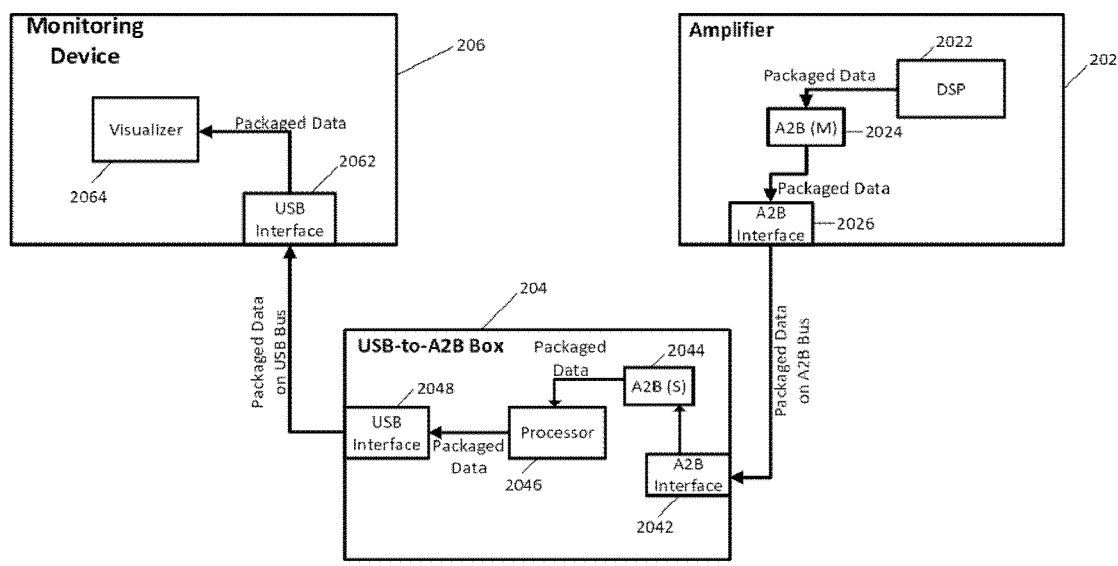
FIG. 2 illustrates a block diagram of system for real-time data monitoring with details according to one or more embodiments.

FIG. 1 illustrates an overview block diagram of system 100 for real-time data monitoring according to one or more embodiments. When performing tuning operation, the system 100 may include an amplifier 102 in a vehicle, a USB-to-A2B Box 104 which may be connected to the amplifier 102, and a monitoring device 106 connected to the USB-to-A2B Box 104. The USB-to-A2B Box 104 is configured to transfer the data from the vehicle amplifier 102 to the monitoring device 106 for realizing the real-time data monitoring. The monitoring device 106 may be a personal computer, laptop, monitor, or any device that could run various applications FIG. 2 illustrates a block diagram of the system 200 for real-time data monitoring with details according to one or more embodiments. Similar with FIG. 1, the system 200 may include a vehicle amplifier 202, a monitoring device 206, and a USB-to-A2B Box 204 which is connected between the amplifier 202 and the monitoring device 206.

The amplifier 202 may include, for example, a digital signal processor (DSP) 2022, which may be preset a package protocol therein (the package protocol will be described below in details) and package the monitoring data into one or more physical A2B channels according to the data package protocol. The packaged data is passed through a master A2B 2024, and transferred to the USB-to-A2B Box 204 via an A2B interface 2026.

The USB-to-A2B Box 204 is configured to transfer the data from the vehicle amplifier 202 to the monitoring device 206 for realizing the real-time data monitoring. The USB-to-A2B Box 204 may include, for example, an A2B interface 2042, a slave A2B 2044, a processor 2046 and a USB interface 2048. The USB-to-A2B Box 204 may receive the packaged data, via the A2B interface 2042. The packaged data may be passed through the slave A2B 2044 and the processor 2046 and then be transferred to the monitoring device 206, for example, via the USB interface 2048.

When the monitoring device 206 receives the packaged monitoring data, for example, via a USB interface 2062 thereof, the monitoring device 206 may unpackage the transferred data by a visualizer application 2064 according to the data package protocol and display the unpackaged monitoring data for the tuning engineer to monitor the data from the vehicle amplifier. The monitoring device 206 may be a personal computer, laptop, monitor, or any device that may run various applications.

In the system 200, the data between the amplifier 202 and the USB-to-A2B box 204 is transferred by the A2B bus. The A2B bus may support up to a maximum of 28 physical data channels at 48 kHz physical sampling rate in real-time. The data length is 32 bits for every channel. The data between the USB-to-A2B box 204 and the monitoring device 206 is transferred by the USB bus. For supporting the monitoring of more than 28 physical data channels, the DSP 2022 in the amplifier packages the monitoring data into the physical A2B data channels from the sampling rate of running data to the physical sampling rate, i.e., 48 kHz. To do this, a data package protocol will be constructed to define how to package the monitoring data into the physical A2B data channel. The DSP in the amplifier follows the data package protocol to package the monitoring data. The data package protocol is constructed to support different monitoring data types, different monitoring data channel number and different monitoring data sampling rate. The data package protocol will be described below referring to FIG. 3.

Figure 3:
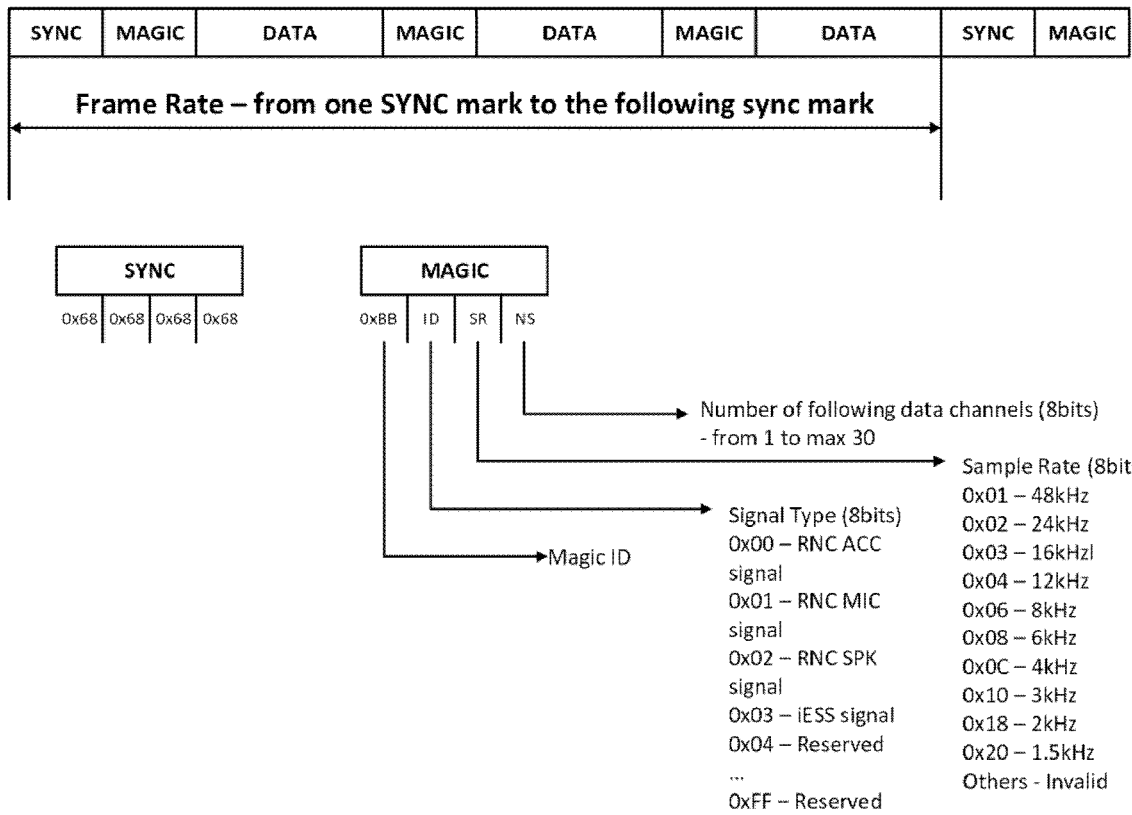
FIG. 3 illustrates a schematic view for a data package protocol according to one or more embodiments.

FIG. 3 illustrates an example regarding the manner in which to package monitoring data into data stream in one physical A2B channel according to a data package is provided. Based on the data package protocol, a data frame may be configured to include one synchronization data unit (e.g., SYNC indicated in FIG. 3), at least one information data unit (e.g., MAGIC indicated in FIG. 3) and at least one monitoring data unit (e.g., DATA indicated in FIG. 3) in one physical A2B channel. The frame showed in FIG. 3 is just an example for illustration. The length of the data frame may vary based on the sampling rate of the monitoring data.

For example, the SYNC data unit may be filled with a SYNC value for synchronizing the monitoring data in one physical A2B data channel. For example, it may be fixed as 0x68686868. The MAGIC data unit may be configured to include four sub-units which are respectively filled with four values represent different information. The length of each sub-unit may be a byte. For example, as indicated in FIG. 3, the four sub-units may include a MAGIC ID sub-unit, an ID sub-unit, a SR sub-unit and a NS sub-unit. The MAGIC ID sub-unit is only an identification mark and may be fixed as, such as 0xBB. The ID sub-unit indicates the monitoring signal type. The user can totally define 255 signal types. The SR sub-unit indicates the sampling rate of the monitoring data, which is the running sampling rate of the monitoring data in DSP algorithm. The user may define only 10 sampling rate values. Other values are invalid. The SR sub-unit indicates the monitoring data channels number.

Examples will be provided below for illustration. The descriptions of the various examples will be presented for purposes of illustration, but are not intended to be exhaustive or limited to the embodiments disclosed. Many modifications and variations will be apparent to those of ordinary skill in the art without departing from the scope and spirit of the described embodiments.

In one example, assuming a Road Noise Cancellation (RNC) algorithm is running in the amplifier, and 12 channels of sensor signals (ACC signals), 8 channels of microphone signals (MIC signals) and 8 channels of speaker signals (SPK signals) in 1.5 kHz sampling rate needs to be monitored in real-time. That is, the monitoring data sampling rate is 1.5 kHz and the physical A2B channel sampling rate is 48 kHz as discussed above. So the number of the total data channels at 1.5 kHz sampling rate in one physical A2B channel may be calculated as follows:

$$CH_{total\ data\ channels} = \frac{FS_{Physical\ A2B\ Channel}}{FS_{Monitoring\ Data}} = \frac{48\ \text{kHz}}{1.5\ \text{kHz}} = 32$$

At the same time, the number of the data channels that will be consumed at 1.5 kHz if using only one physical A2B channel, may be calculated as follows:

$$CH_{consumed\ data\ channels} = NUM_{SYNC} + NUM_{MAGIC} + NUM_{signal} = 1 + (1+1+1) + (12+8+8) = 32$$

Figure 4:
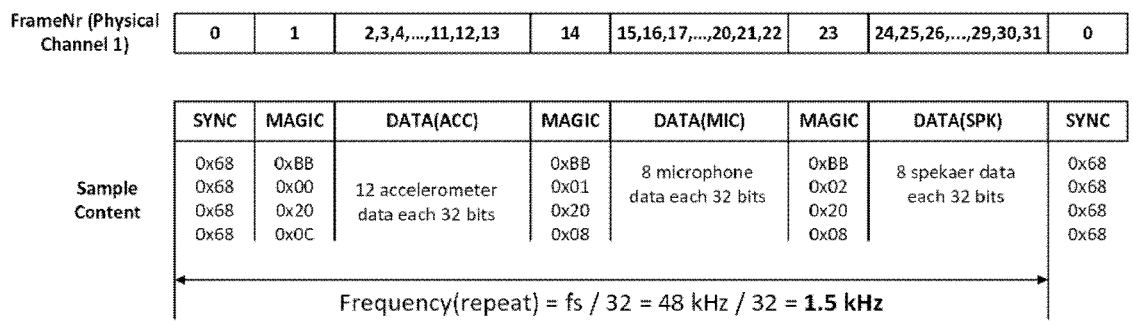
FIG. 4 illustrates a schematic view for data package according to one or more embodiments.

The $CH_{total\ data\ channels}$ is equal to the $CH_{consumed\ data\ channels}$, which corresponds to one physical A2B channel being sufficient in the example. The data package result is given in FIG. 4.

In another example, assuming a RNC algorithm is running in the amplifier, and 16 channels of ACC signals, 8 channels of MIC signals and 8 channels of SPK signals in 1.5 kHz sampling rate needs to be monitored in real-time. That is, the monitoring data sampling rate is 1.5 kHz and the physical A2B channel sampling rate is 48 kHz. So the number of the total data channels at 1.5 kHz sampling rate in one physical A2B channel may be calculated as follows:

$$CH_{total\ data\ channels} = \frac{FS_{Physical\ A2B\ Channel}}{FS_{Monitoring\ Data}} = \frac{48\ kHz}{1.5\ kHz} = 32$$

At the same time, the number of the data channels that will be consumed at 1.5 kHz if using only one physical A2B channel, may be calculated as follows:

$$CH_{consumed\ data\ channels} = NUM_{SYNC} + NUM_{MAGIC} + NUM_{signal} = 1 + (1+1+1) + (16+8+8) = 36$$

The $CH_{total\ data\ channels}$ is less than the $CH_{consumed\ data\ channels}$, which corresponds to one physical A2B channel not being sufficient in this example. The user needs to consider to move the last 8 SPK signals to the second physical A2B channel.

So the total data channels at 1.5 kHz sampling rate in two physical A2B channels may be calculated as follows:

$$CH_{total\ data\ channels} = \frac{FS_{Physical\ A2B\ Channel}}{FS_{Monitoring\ Data}} \times NUM_{physical\ A2B\ channels} = \frac{48\ kHz}{1.5\ kHz} \times 2 = 64$$

Also, the number of the data channels that will be consumed at 1.5 kHz sampling rate if using two physical A2B channels, may be calculated as follows:

$$CH_{consumed\ data\ channels} = NUM_{SYNC} + NUM_{MAGIC} + NUM_{signal} = (1+1) + (1+1+1) + (16+8+8) = 37$$

The $CH_{total\ data\ channels}$ is larger than the $CH_{consumed\ data\ channels}$, when using the two physical A2B channels. So the user needs to use two physical A2B channels for the packaged monitoring data in this example. The packaged data stream based on the data package protocol discussed above is illustrated in FIG. 5.

Moreover, in another example, in the case that the Internal Engine Sound Synthesis (iESS) algorithm is running in the amplifier, the user needs to monitor 6 iESS signals at 6 kHz sampling rate in real-time. That is, the monitoring data sampling rate is 6 kHz and the physical A2B channel sampling rate is 48 kHz as discussed above. So the number of the total data channels at 6 kHz sampling rate in one physical A2B channel may be calculated as follows:

$$CH_{total\ data\ channels} = \frac{FS_{Physical\ A2B\ Channel}}{FS_{Monitoring\ Data}} = \frac{48\ kHz}{6\ kHz} = 8$$

At the same time, the number of the data channels that will be consumed at 6 kHz if using only one physical A2B channel, may be calculated as follows:

$$CH_{consumed\ data\ channels} = NUM_{SYNC} + NUM_{MAGIC} + NUM_{signal} = 1 + 1 + 6 = 8$$

The $CH_{total\ data\ channels}$ is equal to the $CH_{consumed\ data\ channels}$, which indicates that one physical A2B channel is enough for in the example. The packaged data stream based on the data package protocol discussed above is showed in FIG. 6.

Figure 7:
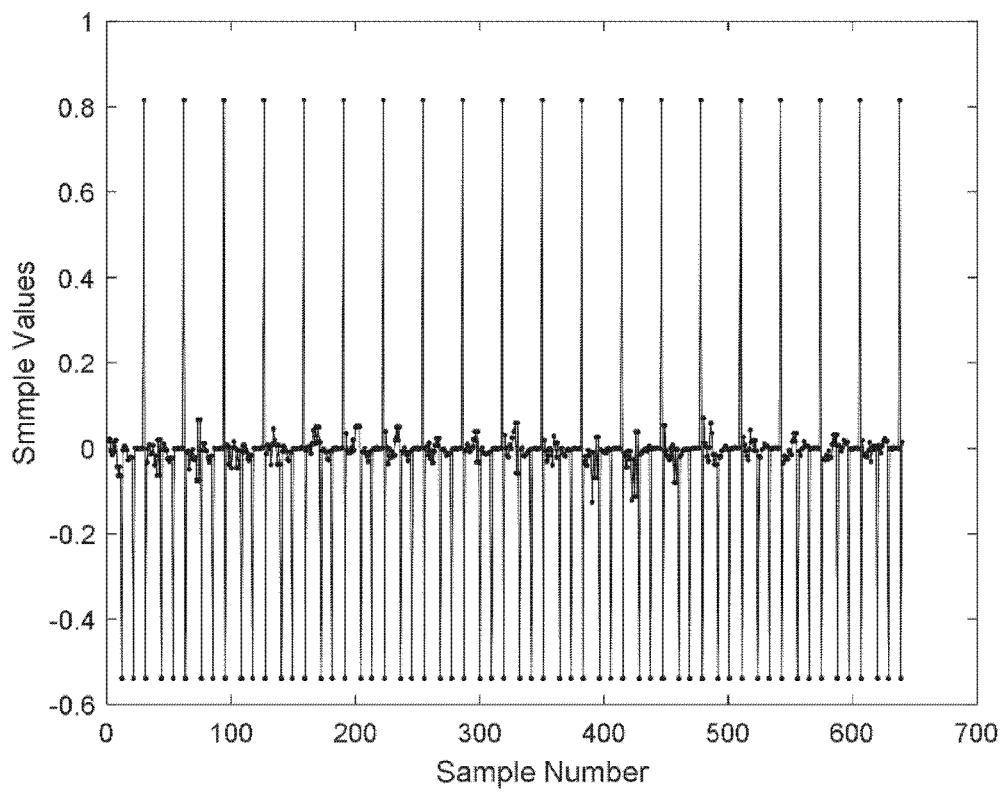
FIG. 7 illustrates an example for showing packaged data stream in one physical A2B channel.
Figure 8:
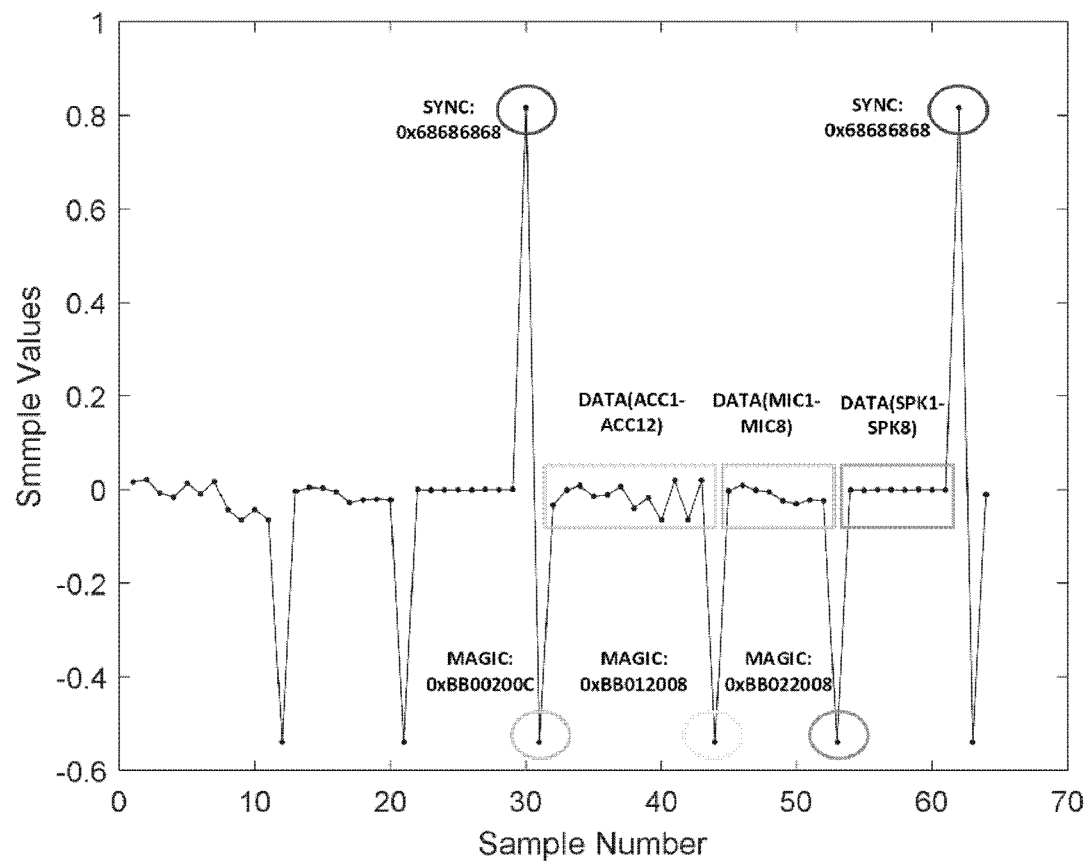
FIG. 8 is a partially enlarged view of FIG. 7.

FIG. 7 illustrates a schematic view of packaged data in a physical A2B channel in the example of monitoring 12 channels of ACC signals, 8 channels of MIC signals and 8 channels of SPK signals in 1.5 kHz sampling rate, and FIG. 8 is a partially enlarged view of FIG. 7. FIG. 7 and FIG. 8 visually illustrate the packaged data stream according to the data packaging protocol discussed above.

Figure 9:
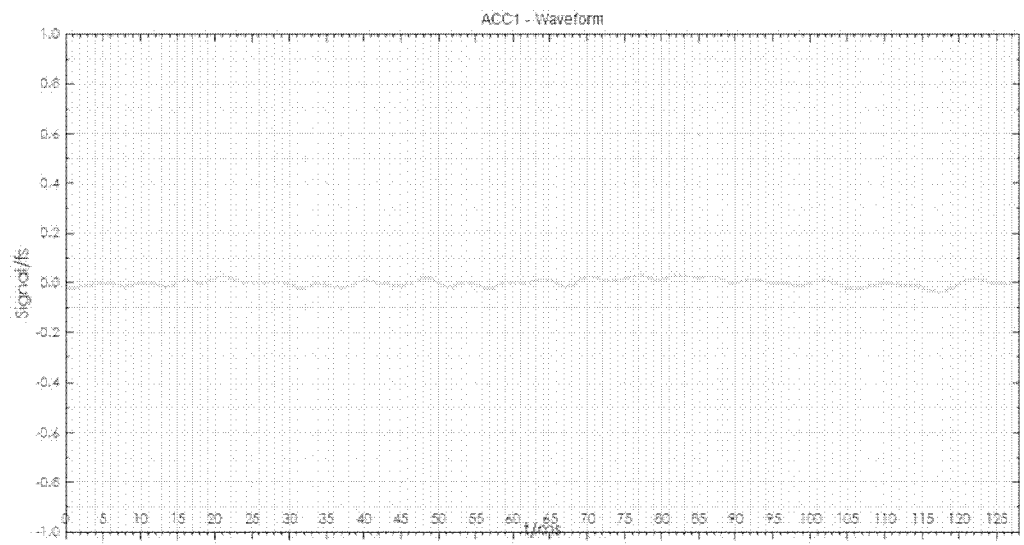
FIG. 9 illustrates a schematic example of displaying for monitoring data in the visualizer.

FIG. 9 illustrates a schematic view of displaying for monitoring data in the visualizer. Although FIG. 9 illustrates an ACC signal of the RNC algorithm in one channel as an example. is the noted example may be presented for illustration. It is recognized that the example is not intended to be exhaustive or limited to the embodiments disclosed.

In addition to the above examples, the data package protocol includes two special cases for 24 kHz sampling rate and 48 kHz sampling rate data monitoring at the same time. For the case of 48 kHz data monitoring, there is no "place" in the data stream for the SYNC and the MAGIC pattern. In this case, the monitoring data may be considered as a signal with 48 kHz sampling rate when the visualizer does not find the SYNC and MAGIC. However, the visualizer may not know the type of the signal.

For the case of 24 kHz data monitoring, the user can place the SYNC pattern or MAGIC pattern in the date stream. In this case, if the visualizer detects only SYNC pattern with one following sampling data, then the sampling rate could be considered as 24 kHz. If the visualizer detects only MAGIC pattern with one following sampling data, then the visualizer can exact the information from MAGIC and obtain the information of data type, data sampling rate and the number of data channel. It can also be understood, in the case that only the MAGIC pattern with one following sampling data can be detected, the MAGIC pattern may be derived by the visualizer that the data sampling rate should be considered as 24 kHZ, and the number of data channel should be fixed to 1.

Figure 10:
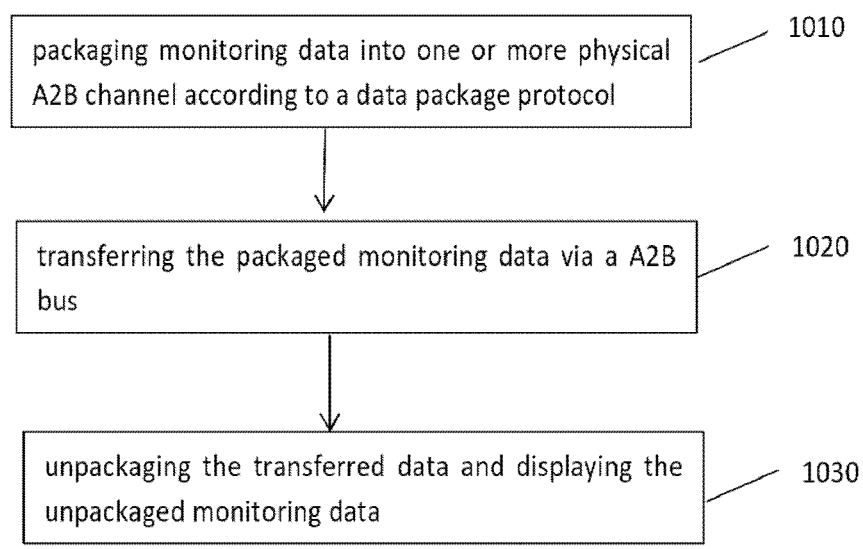
FIG. 10 illustrates a flowchart of a method according to one or more embodiments.

FIG. 10 illustrates a flowchart of a real-time data monitoring method for a vehicle according to one or more embodiments. As shown in FIG. 10, at block 1010, a packaging step may be performed, for example by a DSP in the vehicle amplifier. The monitoring data may be packaged into one or more physical A2B channels according to a data package protocol.

Then, at block 1020, the packaged monitoring data may be transferred via a A2B bus. For example, the packaged data may be transferred by the amplifier to the USB-to-A2B box via the A2B bus. Then, the USB-to-A2B box transfer the packaged data to the monitoring device for example, via the USB bus.

At block 1030, the packaged monitoring data may be unpackaged and the unpackaged monitoring data may be displayed for the user. For example, the packaged monitoring data may be unpackaged by a visualizer in the monitoring device which has predetermined the data package protocol. Then, the unpackaged data may be displayed for the user. By using this method showed in FIG. 10, the user can monitor all the data in the vehicle amplifier for different data type, different data sampling rate and different data channel numbers. Furthermore, all the data can be monitored at the same time.

Figure 11:
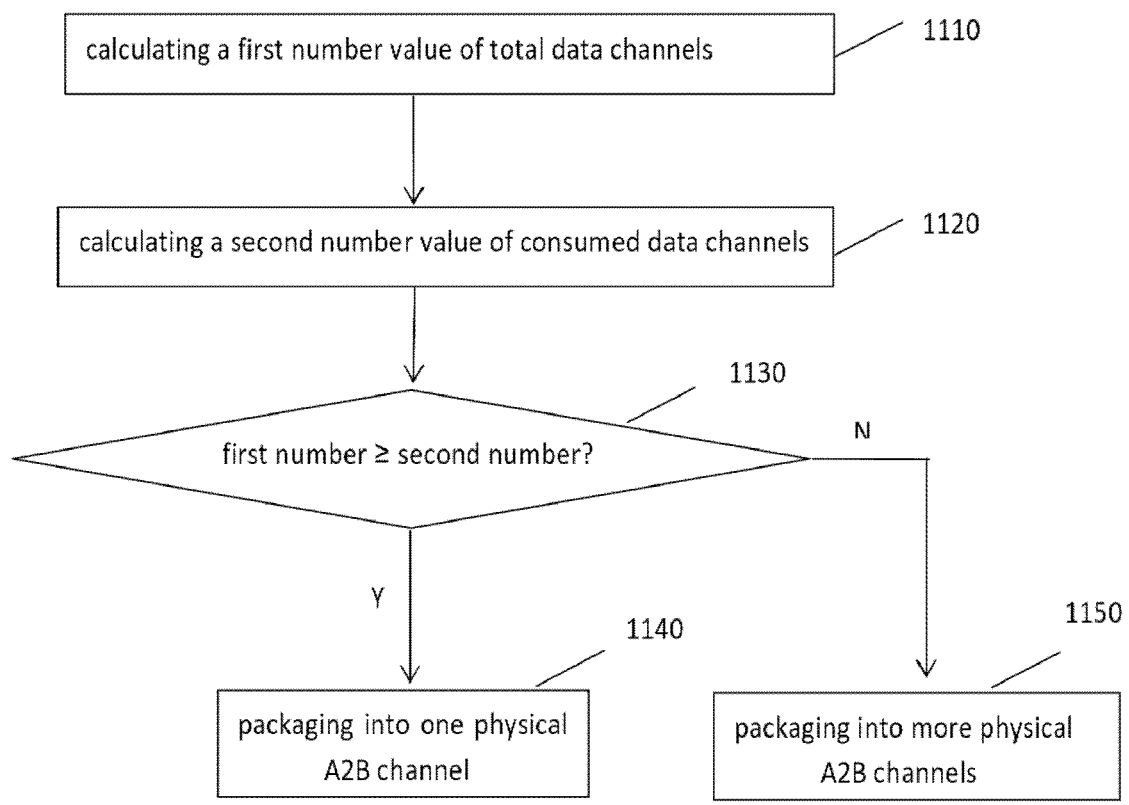
FIG. 11 illustrates a flowchart of method according to one or more embodiments.

FIG. 11 illustrates a method of packaging data based on the data package protocol according to one or more embodiments. As shown in FIG. 11, at block 1110, a first number value of total data channels for monitoring data may be calculated. For example, a first number value of total data channels may be calculated based on a sampling rate of monitoring data and an A2B channel sampling rate.

At block 1120, a second number value of consumed data channels for monitoring data may be calculated in the case of using one physical A2B channel. For example, a second number value of consumed data channels for monitoring data may be calculated based on the number of the signal types, the total number of signals and the number of information data unit for one physical A2B channel.

At block 1130, the first number value is compared to the second number value. If the first number value is equal to or larger than the second number value, then at block 1140, packaging monitoring data into one physical A2B channel. If the first number value is less than the second number value, then at block 1150, packaging monitoring data into more than one physical A2B channel.

The different examples, embodiments, and aspect described herein discuss monitoring all the data in the vehicle amplifier for different data type, different data sampling rate and different data channel numbers to optimize the user's convenience for system tuning.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, creates an apparatus for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method of real-time data monitoring for a vehicle, comprising:
    packaging monitoring data into one or more physical Automotive Audio Bus (A2B) channels according to a data package protocol;
    transferring the packaged monitoring data via an A2B bus; and
    unpackaging the transferred packaged monitoring data and displaying the unpackaged monitoring data,
    wherein packaging the monitoring data further comprising:
        calculating a first number value of total data channels for the monitoring data;
        calculating a second number value of consumed data channels for the monitoring data based on one physical A2B channel;
        comparing the first number value and the second number value; and
        packaging the monitoring data into one or more physical A2B channels based on the comparison.

2. The method of claim 1, wherein the data package protocol is configured to form a data frame including one synchronization data unit, at least one information data unit and at least one monitoring data unit for one physical A2B channel.

3. The method of claim 2, wherein
    the synchronization data unit is filled with a value for synchronizing the monitoring data in one physical A2B data channel;
    the at least one information data unit includes four sub-units which are respectively filled with four values, each value represents one of an identification, a signal type, a sampling rate and a number of data channels for the monitoring data; and
    the at least one monitoring data unit is filled with the monitoring data associated with the at least one information data unit.

4. The method of claim 1, further comprises:
    packaging the monitoring data into one physical A2B channel in response to the first number value being equal to or larger than the second number value.

5. The method of claim 1, further comprises:
    packaging the monitoring data into more than one physical A2B channel in response to the first number value being less than the second number value.

6. The method of claim 1, wherein the calculating the first number value of total data channels for monitoring data includes calculating the first number value of total data channels based on a sampling rate of the monitoring data and on an A2B channel sampling rate.

7. The method of claim 1, wherein the calculating the second number value of consumed data channels includes calculating the second number value of consumed data channels based on a number of at least one information data unit for one physical A2B channel, a number of signal types, and a total number of signals for monitoring data.

8. The method of claim 1, wherein the unpackaging the transferred data includes extracting information from at least one information data unit of the packaged monitoring data to obtain a signal type, a sampling rate, and a number of data channels for monitoring data.

9. A system of real-time data monitoring for a vehicle, comprising:
    an amplifier configured to package monitoring data into one or more physical Automotive Audio Bus (A2B) channels according to a data package protocol, and transfer the packaged monitoring data via a A2B bus;
    a Universal Serial Bus (USB) to A2B Box configured to receive the packaged monitoring data via a A2B bus and transfer the packaged monitoring data; and
    a monitoring device configured to receive the packaged monitoring data from the USB-to-A2B Box, unpackage the transferred packaged monitoring data according to the data package protocol and display the unpackaged monitoring data,
    wherein the amplifier is further configured to:
        calculate a first number value of total data channels for the monitoring data;
        calculate a second number value of consumed data channels for the monitoring data based on one physical A2B channel;
        compare the first number value and the second number value; and
        based on the comparison result, package the monitoring data into one or more physical A2B channels.

10. The system of claim 9, wherein the data package protocol is configured to form a data frame including one synchronization data unit, at least one information data unit, and at least one monitoring data unit for one physical A2B channel.

11. The system of claim 10, wherein
    the synchronization data unit is filled with a value for synchronizing the monitoring data in one physical A2B data channel;
    the information data unit includes four sub-units which are respectively filled with four values, each represents one of an identification, a signal type, a sampling rate and a number of data channels for the monitoring data; and
    the monitoring data unit is filled with the monitoring data associated with the information data unit.

12. The system of claim 9, wherein the amplifier is further configured to:
    package the monitoring data into one physical A2B channel in response to the first number value being equal to or larger than the second number value.

13. The system of claim 9, wherein the amplifier is further configured to:

package the monitoring data into more than one physical A2B channel in response to the first number value being less than the second number value.

14. The system of claim 9, wherein the amplifier is further configured to calculate a first number value of total data channels based on a sampling rate of the monitoring data and on a sampling rate of the one physical A2B channel.

15. The system of claim 9, wherein the amplifier is further configured to calculate a second number value of consumed data channels based a number of the information data unit for one physical A2B channel, a number of signal types, and a total number of signals for monitoring data.

16. The system of claim 10, wherein the monitoring device is further configured to extract information from the at least one information data unit of the packaged data to obtain a signal type, a sampling rate and a number of data channels for monitoring data.

17. A non-transitory computer-readable storage medium including instructions that, when executed by one or more processors, perform real-time data monitoring for a vehicle, the computer-readable storage medium comprising instructions for:
  packaging monitoring data into one or more physical Automotive Audio Bus (A2B) channels according to a data package protocol;
  transferring the packaged monitoring data via an A2B bus;
  unpackaging the transferred packaged monitoring data and displaying the unpackaged monitoring data;
  calculating a first number value of total data channels for the monitoring data;
  calculating a second number value of consumed data channels for the monitoring data based on one physical A2B channel;
  comparing the first number value and the second number value; and
  based on the comparison result, packaging the monitoring data into one or more physical A2B channels.

18. The computer-readable storage medium of claim 17, further comprising instructions for forming, via the data package protocol, a data frame including one synchronization data unit, at least one information data unit and at least one monitoring data unit for one physical A2B channel.

19. A method of real-time data monitoring for a vehicle, comprising:
  packaging monitoring data into one or more physical Automotive Audio Bus (A2B) channels according to a data package protocol;
  transferring the packaged monitoring data via an A2B bus; and
  unpackaging the transferred packaged monitoring data and displaying the unpackaged monitoring data,
  wherein the data package protocol is configured to form a data frame including one synchronization data unit, at least one information data unit and at least one monitoring data unit for one physical A2B channel,
  wherein the synchronization data unit is filled with a value for synchronizing the monitoring data in one physical A2B data channel;
  wherein the at least one information data unit includes four sub-units which are respectively filled with four values, each value represents one of an identification, a signal type, a sampling rate and a number of data channels for the monitoring data; and
  the at least one monitoring data unit is filled with the monitoring data associated with the at least one information data unit.

* * * * *